United States Patent [19]
Kanai et al.

[11] Patent Number: 4,573,705
[45] Date of Patent: Mar. 4, 1986

[54] SUSPENSION AND STEERING CONTROL OF MOTOR VEHICLES

[75] Inventors: Seita Kanai; Hirotaka Kanazawa, both of Hiroshima, Japan

[73] Assignee: Mazda Motor Corporation, Hiroshima, Japan

[21] Appl. No.: 553,390

[22] Filed: Nov. 18, 1983

[30] Foreign Application Priority Data

Nov. 22, 1982 [JP] Japan ............... 57-204795
Nov. 22, 1982 [JP] Japan ............... 57-204796
Nov. 22, 1982 [JP] Japan ............... 57-204797

[51] Int. Cl.$^4$ ............................. B60G 17/08
[52] U.S. Cl. ......................... 280/708; 74/498; 180/141; 280/6 R; 280/707
[58] Field of Search ............ 280/708, 707, 714, 772, 280/DIG. 1, 6 R, 6 H, 6.1; 180/41, 141, 112 A, 133; 74/498; 364/424

[56] References Cited

U.S. PATENT DOCUMENTS

| | | | |
|---|---|---|---|
| 3,042,392 | 7/1962 | Schmitz et al. | 280/708 X |
| 3,061,330 | 10/1962 | Alfieri | 280/DIG. 1 |
| 3,608,925 | 9/1971 | Murphy | 280/707 X |
| 3,770,292 | 11/1973 | Palazzetti | 280/708 |
| 3,831,969 | 8/1974 | Lindblom | 280/707 |
| 3,848,862 | 11/1974 | Ito et al. | 280/708 |
| 3,895,816 | 7/1975 | Takahashi et al. | 280/6 H |
| 4,313,529 | 2/1982 | Kato et al. | 188/319 X |
| 4,345,661 | 8/1982 | Nishikawa | 180/141 |

FOREIGN PATENT DOCUMENTS

| | | | |
|---|---|---|---|
| 1081549 | 6/1954 | France | 74/498 |
| 55-55059 | 4/1980 | Japan . | |
| 55-109008 | 7/1980 | Japan . | |
| 2071587 | 9/1981 | United Kingdom | 280/708 |

Primary Examiner—Joseph F. Peters, Jr.
Assistant Examiner—Mitchell J. Hill
Attorney, Agent, or Firm—Fleit, Jacobson, Cohn & Price

[57] ABSTRACT

A motor vehicle including a body, steerable front wheels and rear wheels for supporting the body, front suspension mechanisms between the body and the front wheels and rear suspension mechanisms between the body and the rear wheels, a power steering mechanism for operating the front wheels with desired steering characteristics, the front and rear suspension mechanisms including suspension struts which resist vertical movements of the body with respect to the wheels with damping powers and having spring rates. A control circuit is provided for changing the ratio of the damping powers and the spring rates in the front suspension mechanisms relative to those in the rear suspension mechanisms and at the same time changing the power assist force of the steering mechanism.

16 Claims, 21 Drawing Figures

SUSPENSION AND STEERING CONTROL OF MOTOR VEHICLES

The present invention relates to motor vehicles and more particularly to motor vehicles having suspension means of variably characteristics and steering means of variably adjustable characteristics. More specifically, the present invention pertains to control means for such adjustable suspension means and adjustable steering means.

In motor vehicles, suspension mechanisms are employed for supporting the weights of the vehicles and absorbing shock loads which may otherwise be transmitted from ground surfaces to the vehicles. The suspension mechanisms are known as having substantial influences not only on driving comfort, but also on pitching and rolling movements as well as steering stability and maneuverability of the vehicles. It has therefore been considered that the maneuverability of the vehicle can be changed in various ways by changing the characteristics of the suspension mechanisms. For example, in Japanese utility model application No. 54-8394 filed on Jan. 27, 1979 and disclosed for public inspection on July 30, 1980 under the disclosure No. 55-109008, there is proposed a suspension control system in which the absorptive properties of rear shock absorbers are weakened with respect to those of front shock absorbers to provide the vehicle with under-steer characteristics when the vehicle is steered at a high speed. With this control, it is possible to improve steering stability of the vehicle. The utility model application further proposes to weaken the absorptive properties of the front shock absorbers with respect to those of the rear shock absorbers to provide the vehicle with substantially neutral or over-steer characteristics at low speed operation.

In Japanese utility model application No. 55-46386 filed on Apr. 8, 1980 and disclosed for public inspection on Nov. 6, 1981 under the disclosure No. 56-147107, there is proposed means to control the shock absorbers so that their absorptive characteristics are strengthened when the vehicle is steered beyond a predetermined angle at a vehicle speed exceeding a predetermined value. The proposed control is effective to suppress vehicle rolling movements within a certain rate and thereby improve controllability and driving comfort of the vehicle.

With regard to the steering mechanisms of motor vehicles, there have also been various proposals in view of their important influences on the stability and controllability of the vehicles. Recent trends are that power steering devices are widely employed in order to make it easy to steer. Further, various proposals have been made to improve the power steering devices. For example, Japanese patent application No. 53-126368 filed on Oct. 14, 1978 and disclosed for public inspection on Apr. 22, 1980 under the disclosure No. 55-55059 proposes to control hydraulic pumps for power steering systems in accordance with vehicle speeds, loads on steerable wheels and/or resistance force to steering efforts, so that a suitable quantity of hydraulic oil is applied to power cylinders to thereby ensure steering stability.

The aforementioned prior efforts are to make improvements separately in suspension mechanisms and in steering mechanisms and can actually provide certain advantages. It should however be noted that such prior measures for effecting improvements separately in suspension and steering mechanisms cannot always provide satisfactory results because tastes for vehicle performance, such as riding comfort, controllability and so on, are very different among persons so that one measure does not always comply with each person's demand.

It is therefore an object of the present invention to provide adjusting means in which suspension and steering mechanisms are adjusted with close relationship with each other so that any person can obtain desired controllability, stability and riding comfort.

Another object of the present invention is to provide adjusting means in which suspension mechanisms are divided into two groups and these groups are adjusted to provide different suspension characteristics.

A further object of the present invention is to provide adjusting means in which front and rear suspension mechanisms can be separately adjusted and the steering mechanism can also be adjusted in relation to the adjustment of the suspension mechanisms.

Still a further object of the present invention is to provide adjusting means in which the front pair of suspension mechanisms are adjusted separately from the rear pair of suspension mechanisms to provide desired controllability of a vehicle.

According to the present invention, the above and other objects can be accomplished by a motor vehicle including a body, wheels for supporting said body and including steerable wheels, first suspension means between said body and at least one of said wheels, second suspension means between said body and the other of said wheels, steering means for operating said steerable wheels with desired steering characteristics, said first suspension means including first resistance means which provides a first resistance to vertical movements of said body with respect to said wheels with desired first resistance characteristics, said second suspension means including second resistance means which provides a second resistance to vertical movements of said body with respect to said wheels with desired second resistance characteristics, first adjusting means for adjusting at least one of said first and second resistance characteristics of said suspension means to change the ratio of said first to said second resistance characteristics, second adjusting means for adjusting said steering characteristics of said steering means, control means for providing a control signal having a relation to the adjustment of said ratio of the first to the second resistance characteristics of said first and said second suspension means and for applying the control signal to the second adjusting means so that the steering characteristics are adjusted with relation to the adjustment of said ratio of the first to the second resistance characteristics of the first and second suspension means. In the case of a four-wheeled motor vehicle having a suspension mechanism for each of the four wheels, the front suspension mechanisms may constitute the first suspension means so that they may simultaneously be adjusted to provide substantially the same resistance characteristics, and the rear suspension mechanisms may constitute the second suspension means so that they may be adjusted differently from the front suspension mechanism. With this arrangement, the ratio of the resistance characteristics in the front suspension mechanism to those in the rear suspension mechanism can be adjusted as desired to obtain a desired vehicle controllability. Alternatively, the resistance characteristics of only the front or rear suspension mechanisms may be adjusted. In a further alternate arrangement, the front right and the rear left suspension mechanisms may constitute the first suspension means and the front left and the rear right suspension means may constitute the second suspension means.

A suspension mechanism for motor vehicles usually includes damping means having damping characteristics and spring means having a spring rate. In this type of suspension mechanism, the resistance characteristics are determined by the damping characteristics and/or the spring rates so that the resistance characteristics can be changed by adjusting one or both of these factors. In order to make it possible to adjust the spring rate, the spring means may preferably be comprised of an air spring.

Where a manually operated steering mechanism is employed, the gear ratio of the mechanism may be made variable and the gear ratio may be adjusted by the control means. Where a power assisted steering mechanism is employed, the power assisting characteristics may be adjusted.

According to the present invention, the steering characteristics are adjusted with a certain relation to the adjustment of the ratio of the first to second resistance characteristics of the first and the second suspension means so that any change in the vehicle controllability due to a change in the resistance characteristics ratio can be strengthened or weakened by a change in the vehicle controllability due to a change in the steering characteristics to thereby obtain desired vehicle maneuvering characteristics. More specifically, an adjustment of the ratio of the first to the second resistance characteristics of the first and the second suspension means produces a change in the controllability of the vehicle. For example, the under-steer of the vehicle may be intensified to give the vehicle a relatively loose controllability or weakened to give a relatively tight controllability. These tendencies may further be intensified to provide further loose or tight control or weakened to provide a moderate nature. It will thus be understood that the present invention is effective to provide the possibility of selecting wide varieties of vehicle controllability.

Speaking more specifically, in a vehicle having under-steer, the vehicle may be provided with manual means for adjusting the ratio of the first and the second resistance characteristics of the first and the second suspension means to selectively provide weak under-steer and strong under-steer. When the suspension means is to be adjusted to provide strong understeer, the power steering means may simultaneously be adjusted to decrease the power assist force. Then, the driver will clearly feel that under-steer was intensified. On the contrary, if the assist force of the power steering means is increased, strong under-steer will not be felt by the driver although under-steer is intensified. The same is also true when the suspension means is adjusted to provide weak under-steer. Such controllability of the vehicle may be determined during manufacture, or the vehicle may be provided with a suitable manual device such as a manual switch so that the driver can select a desired controllability.

It is further possible to adjust the resistance characteristics of the suspension means in accordance with one or more of factors representing operating conditions of the vehicle, such as the vehicle speed, the loads on the vehicle and the steering angle. With this arrangement, it becomes possible to provide suitable controllability under any operating conditions. For example, the vehicle may be provided with under-steer which is intensified in accordance with an increase in the vehicle speed. In such an instance, if the power assist force of the power steering means is decreased in response to an increase in the vehicle speed, the vehicle stability is increased at high speed operation while providing a sharp controllability of the vehicle at low speed operation. In contrast, if the power assist force is increased in response to an increase in the vehicle speed, the strong under-steer at high speed operation is not felt by the driver, even though stability is ensured by intensified under-steer. Further, a relatively moderate turning property will be provided under a low speed operation. Where a manual steering mechanism is used, the gear ratio of the mechanism may be changed instead of changing the power assist force in the power steering means.

It will be therefore be understood that, according to one mode of the present invention, it becomes possible to provide one of the properties shown in the Table below to obtain desired vehicle controllability.

| SUSPENSION UNDER-STEER PROPERTY | STEERING MECH. | | |
|---|---|---|---|
| | POWER ASSIST | GEAR RATIO | FEELING |
| STRONG | WEAK | LARGE | SPORTY |
| WEAK | STRONG | SMALL | |
| STRONG | STRONG | SMALL | MODERATE |
| WEAK | WEAK | LARGE | |

The above and other objects and features of the present invention will become apparent from the following descriptions of preferred embodiments taking reference to the accompanying drawings, in which.

Figure 1:
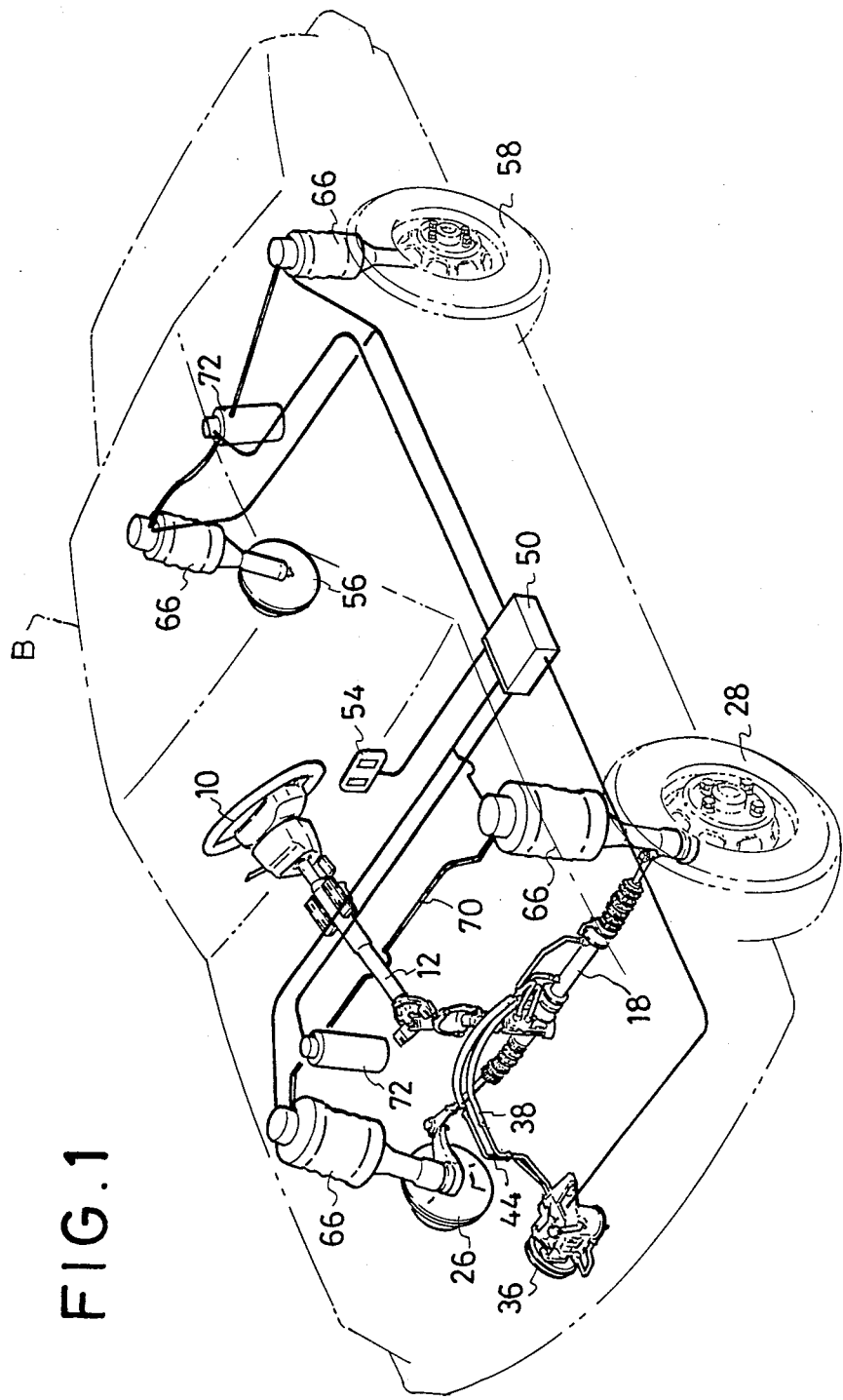
FIG. 1 is a perspective view of a motor vehicle in accordance with one embodiment of the present invention.
Figure 2:
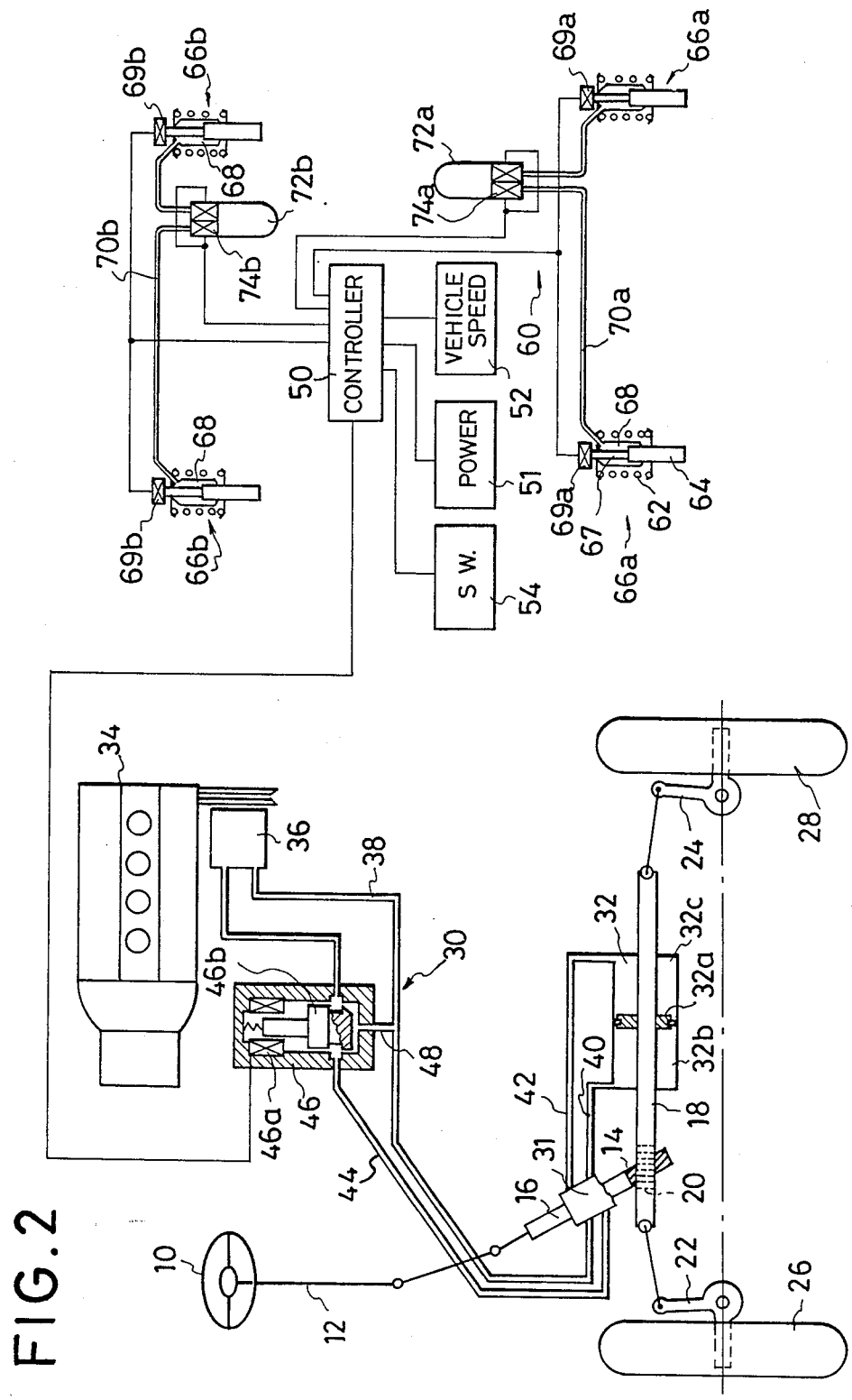
FIG. 2 is a diagrammatical illustration of the suspension and steering adjusting system in the embodiment shown in FIG. 1.

Referring now to the drawings, and particularly to FIGS. 1 and 2, there is shown a motor vehicle having a steering mechanism comprised of a steering wheel 10 connected with a steering shaft 12, which is in turn connected with a pinion shaft 16 formed with a steering pinion 14. The pinion 14 is in meshing engagement with a rack 20 formed on a steering rack shaft 18 which is adapted to be moved in a transverse direction of the vehicle in response to rotation of the pinion. The rack shaft 18 is connected at the opposite ends with knuckle arms 22 and 24 provided respectively on steerable front wheels 26 and 28 to transmit steering forces to the wheels.

In order to assist the steering effort, there is provided a hydraulically operated power assist system 30 which includes a control valve 31 provided on the pinion shaft 16 and a power cylinder 32 provided on the rack shaft 18. For providing a supply of hydraulic pressure to the power cylinder 32, there is a hydraulic oil pump 36 driven by an engine 34. The hydraulic pressure from the pump 36 is transmitted through a pressure line 38 to the control valve 31, which functions to selectively transmit the pressure to one of oil passages 40 and 42 in accordance with the direction of rotation of the steering wheel 10. The power cylinder 32 has a power piston 32a which divides the inside of the power cylinder 32 into two oil chambers 32b and 32c and the oil passages 40 and 42 are respectively connected with the chambers 32b and 32c. The control valve 31 further connects the other of the passages to a return line 44 which is connected with a suction port of the pump 46.

In the return line 44, there is provided a solenoid valve 46 which controls the quantity of the hydraulic oil returned to the oil pump 36. Further, the pressure line 38 is connected with the solenoid valve 46 through a bypass line 48. The solenoid valve 46 has a solenoid 46a of a duty factor type for actuating a valve plunger 46b. The solenoid 46a of the valve 46 is connected with a control circuit 50 to which is adapted to receive a supply of electric power from a power source 51 and produce a control signal for energizing the solenoid 46a in accordance with signals from a vehicle speed detector 52 and a manual switch 54. The valve plunger 46b is axially shifted by a distance proportional to the electric power applied from the circuit 50 to the solenoid 46a to thereby control the bypass flow through the bypass line 48, and therefore to adjust the hydraulic pressure applied to the power cylinder 32.

In FIG. 1, it will be noted that the vehicle shown therein has a body B and there are provided front suspension mechanisms between the body B and the front wheels 26 and 28. Further, the vehicle has a pair of rear wheels 56 and 58 which also support the body B through rear suspension mechanisms. In FIG. 2, the suspension mechanisms are generally designated by a reference numeral 66 and each front suspension mechanism includes a front shock absorber 66a constituted by a spring 62 and an oleo damper 64. Similarly, each rear suspension mechanism includes a rear shock absorber 66b. Around the damper 64 of each shock absorber, there is formed an air spring 68 which is constituted by a suitable resilient material. Although not shown in the drawing, the oleo damper 64 is of a variable orifice type in which the piston of the damper 64 has an orifice of variable diameter. In order to control the orifice diameter, there is provided a plunger (not shown) which passes through the piston rod 67 of the damper 64 and is adapted to be rotated about its own axis by a solenoid to decrease the orifice diameter to thereby increase the damping power. In FIG. 2, the solenoids for the front shock absorbers 66a are designated by 69a and those for the rear shock absorbers 66b are designated by 69b. These solenoids are adapted to be energized by signals from the control circuit 50. The shock absorbers may be of a type disclosed in U.S. Pat. No. 4,313,529.

The air springs 68 for the front suspension dampers 68 are connected through air pipes 70a with a front control air chamber 72a. In order to control the communication between the air pipes 70a and the air chamber 72a, there are provided solenoid valves 74a which are adapted to be energized by a signal from the control circuit 50. Similarly, the air springs 68 for the rear suspension dampers 68 are connected through air pipes 70b with a rear control air chamber 72a and solenoid valves 74b are provided for controlling the communication between the air pipes 70b and the air chamber 72b.

Figure 8:
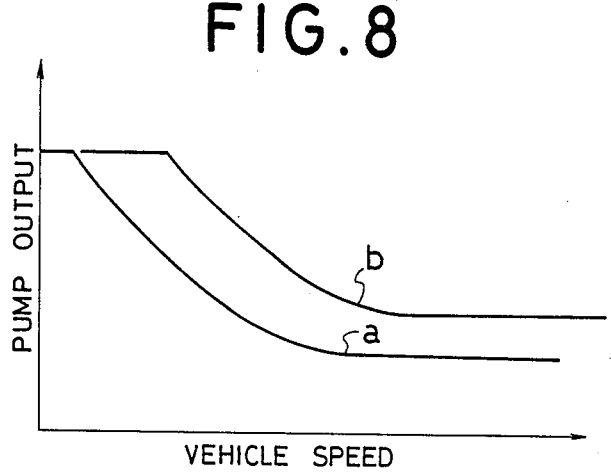
FIG. 8 is a diagram showing control of the hydraulic pump in the steering mechanism in accordance with the vehicle speed.
Figure 9:
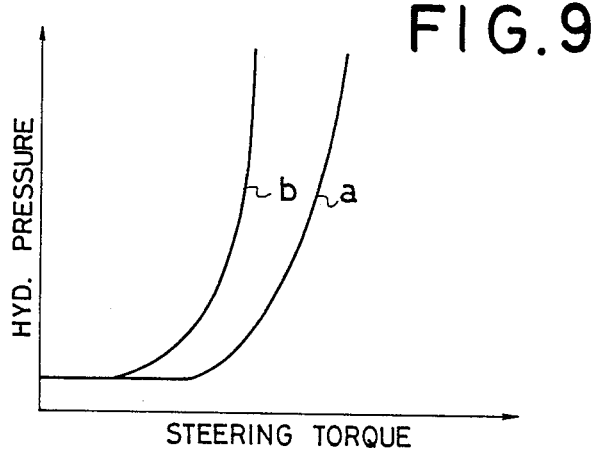
FIG. 9 is a diagram showing the relationship between the hydraulic pressure and the steering torque.

In operation, when the solenoid 46a of the solenoid valve 46 is de-energized, the plunger 46b is maintained at a position in which it closes the bypass line 48 and the return line 44 is opened to the oil pump 36. Thus, a high flow rate is maintained to the power cylinder 32 to provide a high assist force. The control circuit 50 produces an output to the solenoid 46a and the output is gradually increased in response to an increase in the vehicle speed. Thus, the plunger 46b is shifted to open the bypass line 48 and the opening is gradually increased in response to an increase in the vehicle speed. Thus, the hydraulic oil flow through the bypass line 48 is gradually increased as shown for example by a curve a in FIG. 8. Further, the control valve 31 functions to control the hydraulic pressure applied to the power cylinder 32 in accordance with a change in the steering force as shown for example by a curve a in FIG. 9.

In this instance, the solenoids 69a in the front suspension dampers 64 may be de-energized to provide a relatively weak damping power. At the same time, the solenoid valves 74a may be energized to provide a relatively low spring rate. In the rear suspension mechanisms, the solenoids 69b may be energized and the solenoid valves 74b may be de-energized.

Figure 10:
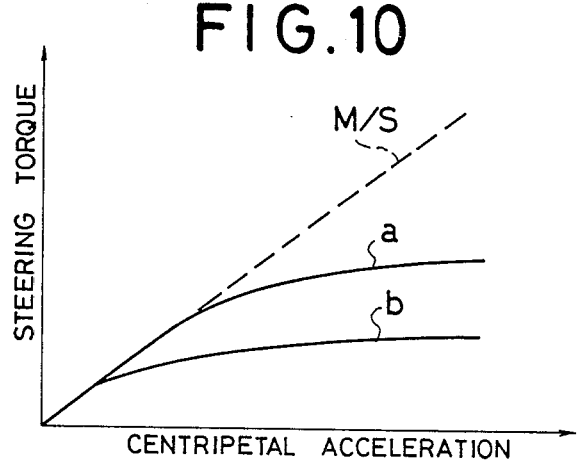
FIG. 10 is a diagram showing the relationship between the steering torque and the centripetal acceleration.

The manual switch 54 may then be actuated to energize the solenoids 69a and de-energize the solenoid valves 74a in the front suspension mechanisms and to de-energize the solenoids 69b and energize the solenoid valves 74b. Thus, the ratio of the damping power in the front suspension mechanisms to that in the rear suspension mechanism and the ratio of the spring rate in the front suspension mechanisms to that in the rear suspension mechanisms can be changed to thereby change the controllability of the vehicle. At the same time, the output power to the solenoid 46a of the control circuit 50 is decreased to move the plunger 46b in the direction of decreasing the opening of the bypass line 48 to thereby increase the hydraulic oil flow to the power cylinder 32 as shown by a curve b in FIG. 8. It will therefore be understood that the hydraulic pressure applied to the power cylinder 32 is increased as shown by a curve b in FIG. 9. It will also be understood that the steering effort required for the driver is decreased from a curve a to a curve b in FIG. 10.

Alternatively, the arrangement may be such that the output power to the solenoid 46a of the control circuit 50 may be increased when the manual switch 54 is closed. This will cause a change in hydraulic oil flow to the power cylinder 32, for example from the curve b to the curve a in FIG. 8.

Figure 4:
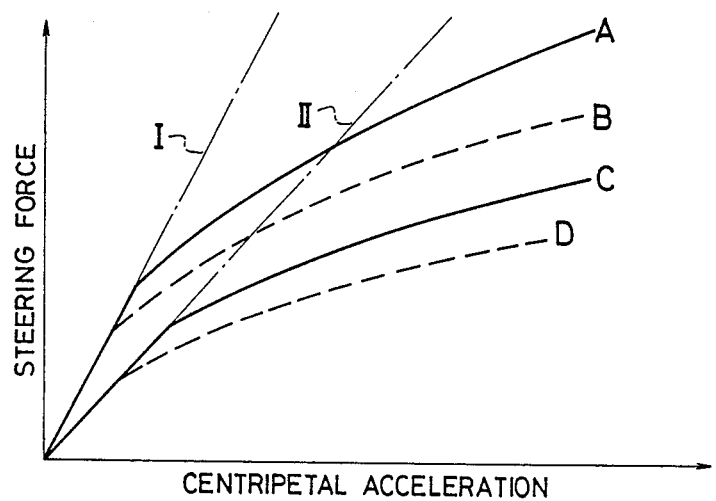
FIG. 4 is a diagram showing the relationship between the steering force and the centripetal acceleration.
Figure 5:
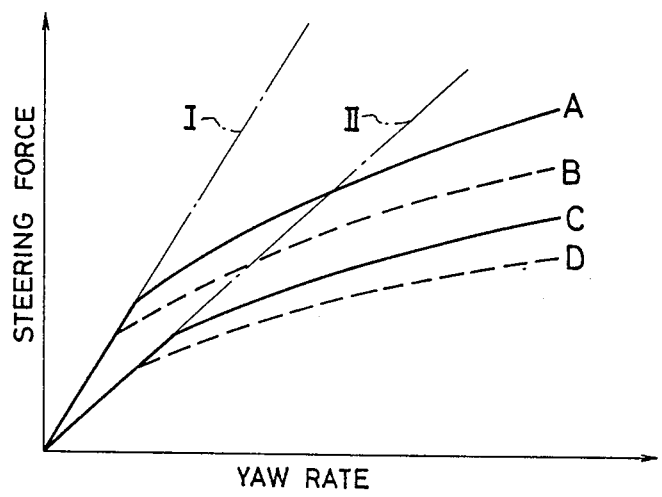
FIG. 5 is a diagram showing the relationship between the steering force and the yaw rate.
Figure 6:
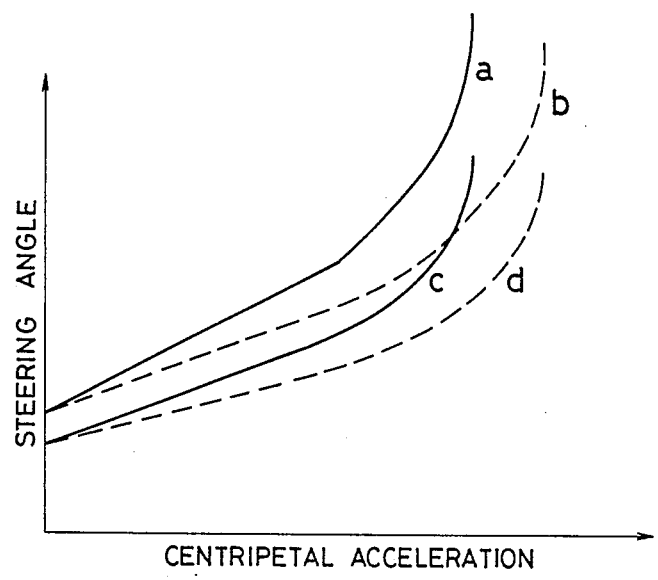
FIG. 6 is a diagram showing the relationship between the steering angle and the centripetal acceleration.
Figure 7:
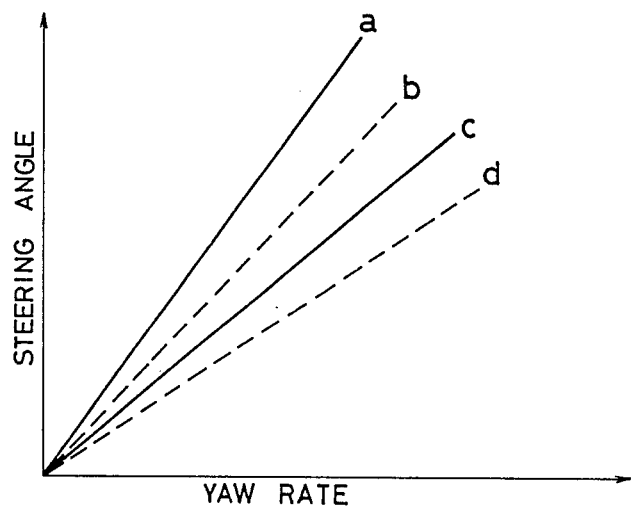
FIG. 7 is a diagram showing the relationship between the steering angle and the yaw rate.

Referring now to FIG. 4, there is shown the relationship between the steering effort and the centripetal acceleration. Further, in FIG. 5, there is shown the relationship between the steering effort and the yaw rate. In the drawings, the line I represents the characteristics in a manual steering mechanism in a vehicle having relatively strong under-steer and line II represents the characteristics in a manual steering mechanism in a vehicle having relatively weak under-steer. In a power steering mechanism, the steering effort changes in a vehicle having relatively strong under-steer as shown by a curve A where the power assist force is high, or as shown by a curve B where the power assist force is low. When the vehicle has relatively weak under-steer, the steering effort changes as shown by a curve C under a high power assist force, and as shown by a curve D under a low assist force. The nature of the under-steer characteristic can be changed by the control of the suspension mechanisms as described previously, and the power assist force can be changed by the control of the power steering system. It is possible to change the characteristics from that shown by the curve A to that shown by the curve B, or from that shown by the curve C to that shown by the curve D.

Figure 3:
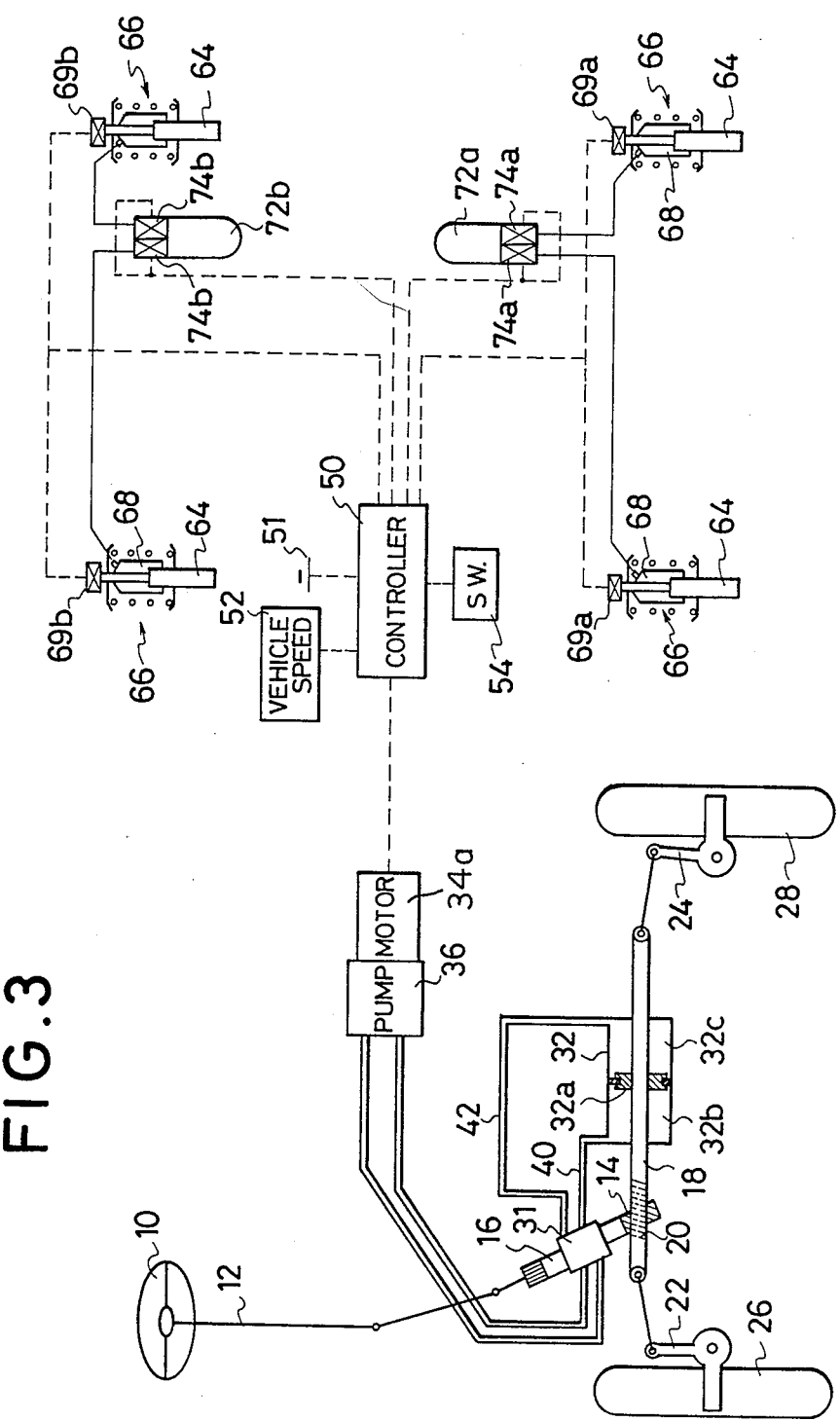
FIG. 3 is a diagrammatical illustration similar to FIG. 2 but showing another embodiment.

Referring to FIG. 3, there is shown another embodiment of the present invention. It will be noted in FIG. 3 that the hydraulic pump 36 is not driven by the engine as in the previous embodiment, but is connected with a motor 34a. The controller 50 produces an output for operating the motor 34a. The flow rate of the hydraulic oil from the oil pump 36 is controlled by the speed of the driving motor 34a, which is in turn determined by the output power of the control circuit 50. In other respects, the arrangements are the same as in the previous embodiment so that corresponding parts are shown by the same reference characters as in the previous embodiment and detailed descriptions will be omitted.

Figure 11:
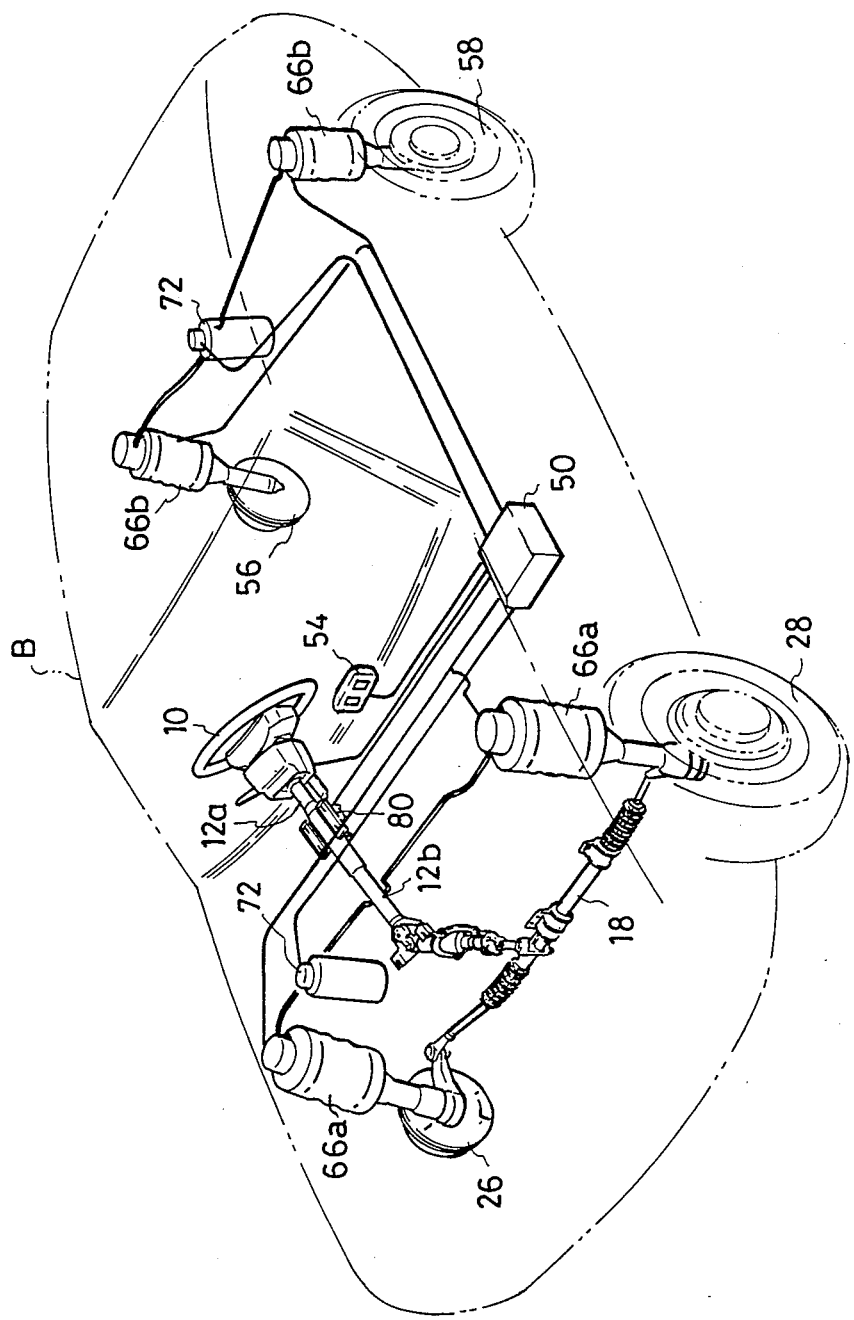
FIG. 11 is a perspective view of a motor vehicle in accordance with another embodiment of the present invention.
Figure 12:
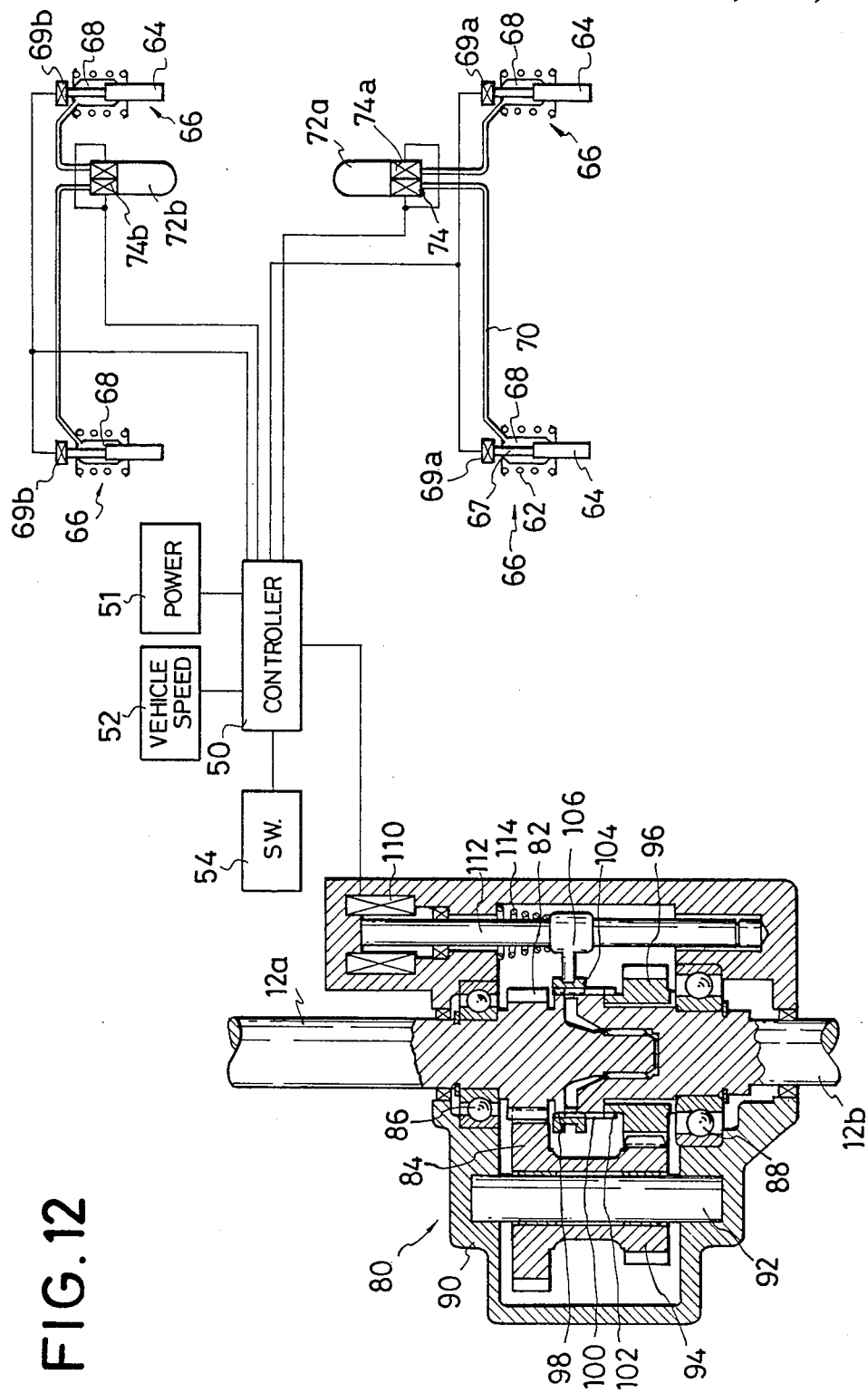
FIG. 12 is a diagrammatical illustration of the suspension and steering control system in the embodiment shown in FIG. 11.

Referring to FIGS. 11 and 12, there is shown another embodiment in which the present invention is applied to a motor vehicle having a manual steering mechanism. In FIG. 11, it will be noted that the steering shaft 12 is divided into an upper shaft portion 12a and a lower shaft portion 12b and there is provided a speed reduction gear mechanism 80. As shown in FIG. 12, the upper shaft portion 12a is formed at its lower end with a gear 82 which is in meshing engagement with an intermediate gear 84 rotatably supported on a casing 90 by a countershaft 92. The shaft portions 12a and 12b are in axial alignment and rotatably carried by the casing 90 respectively through bearings 86 and 88. The intermediate gear 84 is internally formed with a second intermediate gear 94 in which is smaller in diameter than the gear 84. The lower shaft portion 12b rotatably carries a gear 96 which is in meshing engagement with the gear 94.

In order to connect the lower shaft portion 12b alternatively with the upper shaft portion 12a and the gear 96, the upper shaft portion 12a is formed at the lower end with axially extending spline teeth 98 and the lower shaft portion 12b with spline teeth 100. Further, the gear 96 is formed with spline teeth 102. An internally splined coupling sleeve 104 is slidably engaged with the spline teeth 100 on the lower shaft portion 12b and movable between a first position wherein the sleeve 104 bridges the spline teeth 98 and 100 and a second position wherein it bridges the spline teeth 100 and 102. It will thus be understood that the lower shaft portion 12b is directly connected with the upper shaft portion 12a when the sleeve 104 is in the first position, and is connected through the gears 84, 94 and 96 when the sleeve 104 is in the second position.

The coupling sleeve 104 is provided with a shift fork 106 which is slidably mounted on a shaft 112. A spring 114 is provided to bias the shift fork 104 toward the second position of the sleeve 104. A solenoid 110 is provided at one end of the shaft 112 so that the shift fork 106 is moved against the function of the spring 114 to shift the coupling sleeve 104 to the first position. The solenoid 110 is connected with the output of the control circuit 50 so that the gear ratio of the steering mechanism is changed when the manual switch 54 is actuated. The control of the suspension mechanisms is the same as in the previous embodiments so that detailed descriptions will be omitted.

Figure 13:
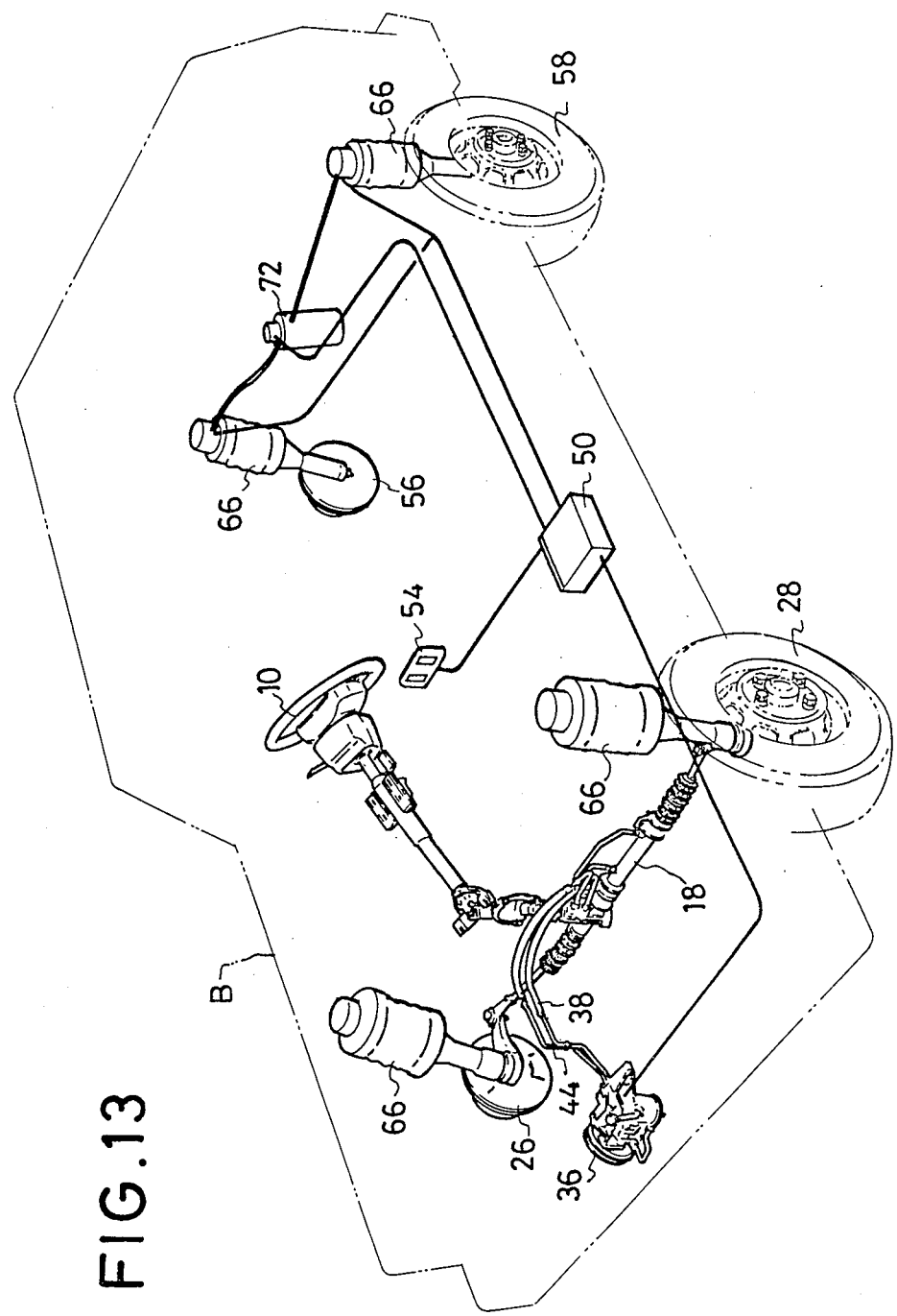
FIG. 13 is a perspective view of a motor vehicle showing a further embodiment.
Figure 14:
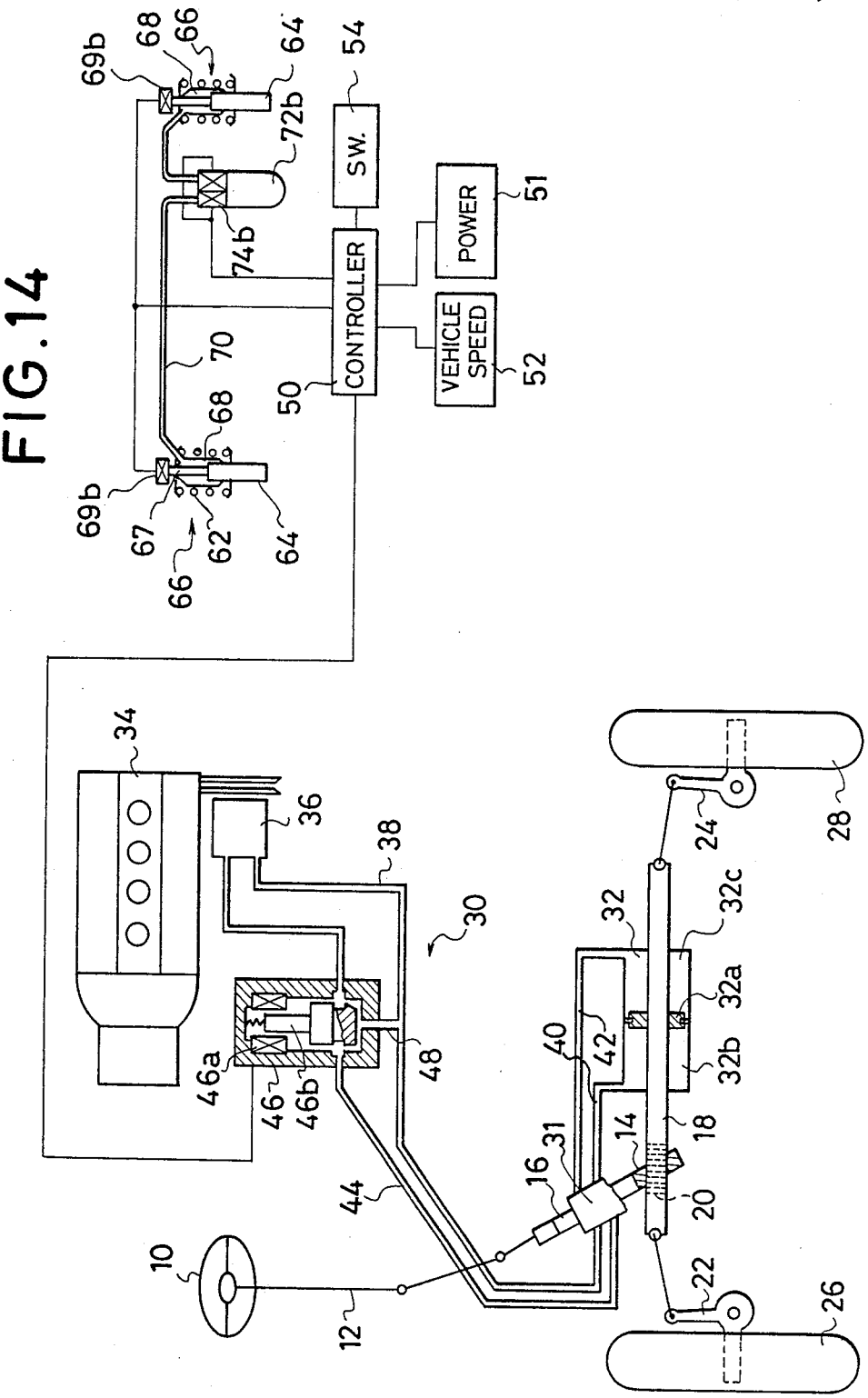
FIG. 14 shows the suspension and steering control system in the embodiment shown in FIG. 13.

In FIGS. 13 and 14, there is shown a further embodiment of the present invention. In this embodiment, the power steering system is the same as in the embodiment shows in FIGS. 1 and 2 so that detailed descriptions will be omitted but corresponding parts are designated by the same reference characters. The embodiment shown in FIGS. 13 and 14 is different from the previous embodiments in that only the rear suspension mechanisms are adjustable in their characteristics. By changing the damping powers of the dampers 64 in the rear suspension mechanisms, it is possible to change the ratio of the damping power in the front suspension mechanisms to that in the rear suspension mechanisms. Further, by changing the spring rate of the air spring 68 in each of the rear suspension mechanisms, it is possible to change the ratio of the spring rate in the front suspension mechanisms to that in the rear suspension mechanisms. Further, these changes are effective to change the controllability of the vehicle. Of course, when the rear suspension mechanisms are adjusted, the power steering system is also adjusted by applying an output of the control circuit 50 to the solenoid 46a of the steering control valve 46.

Figure 15:
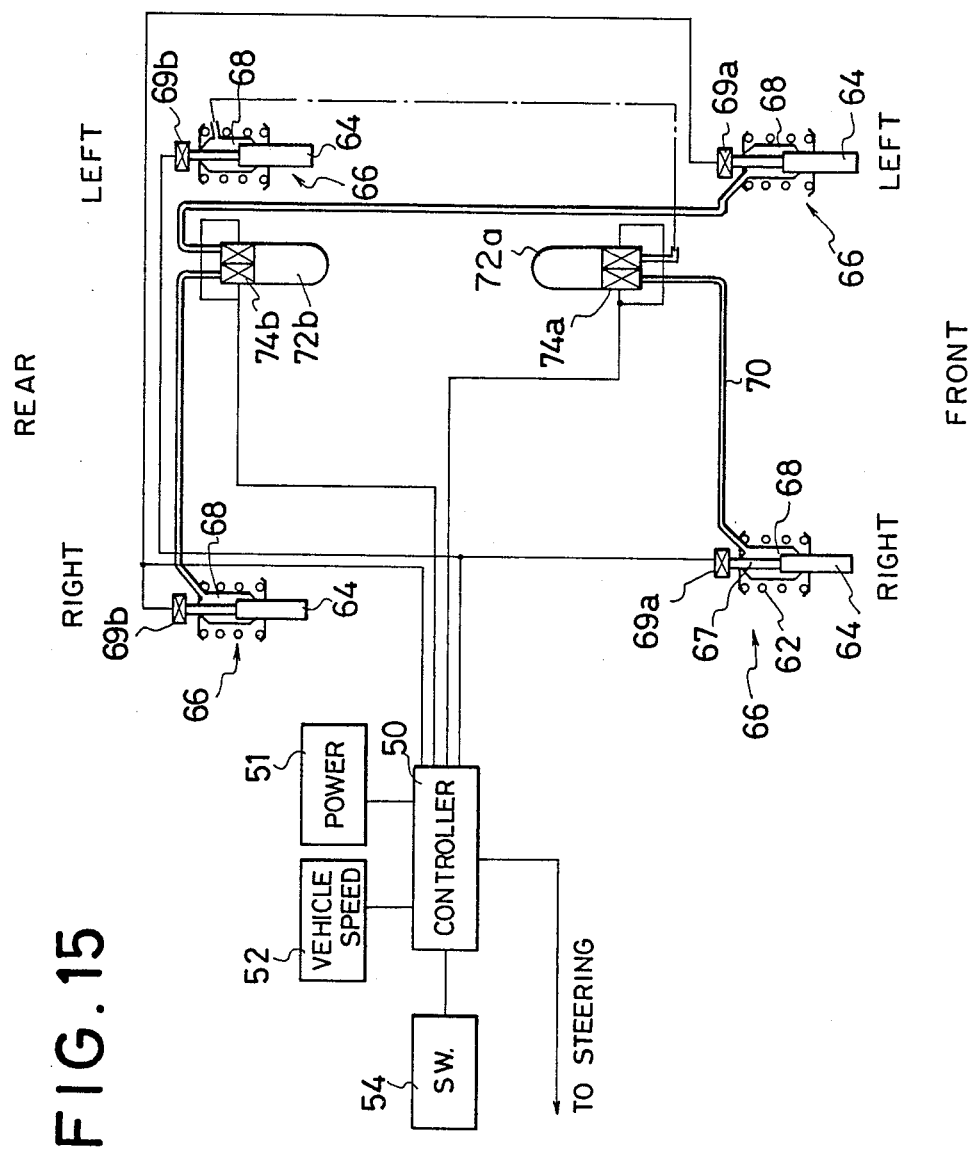
FIG. 15 is a diagrammatical illustration of a suspension control system in accordance with a further embodiment of the present invention.

Referring to FIG. 15, there is shown a further embodiment of the present invention. In this embodiment, the air spring 68 in the front right suspension mechanism and that in the rear left suspension mechanism are connected with the same air chamber 72a, respectively through solenoid valves 74a whereas the air spring 68 in the front left suspension mechanism and that in the rear right suspension mechanism are connected with the same air chamber 72b, respectively through solenoid valves 74b. Further, the solenoid 69a in the front right damper 64 and the solenoid 69b in the rear left damper 64 are connected with the same output of the control circuit 50 so that they are simultaneously energized. Similarly, the solenoid 69a in the front left damper 64 and the solenoid 69b in the rear right damper 64 are connected with the same output of the control circuit 50. It will therefore be understood that the front right and rear left suspension mechanisms are adjusted together in the same way and the front left and rear right suspension mechanisms are also adjusted together. In this embodiment, the control circuit applies an output to the steering mechanism when the manual switch 54 is actuated as in the previous embodiment so that the steering characteristics can be changed when the suspension mechanisms are adjusted. The control circuit 50 produces outputs so that, when the solenoids 69a and 69b in the front right and rear left dampers 64 are energized, solenoids 69a and 69b in the front left and rear right dampers 64 are de-energized and that when the air springs 68 in the front right and rear left dampers 64 are connected with the air chamber 72a, the other air springs 68 are disconnected from the corresponding air chamber 72b.

Figure 16:
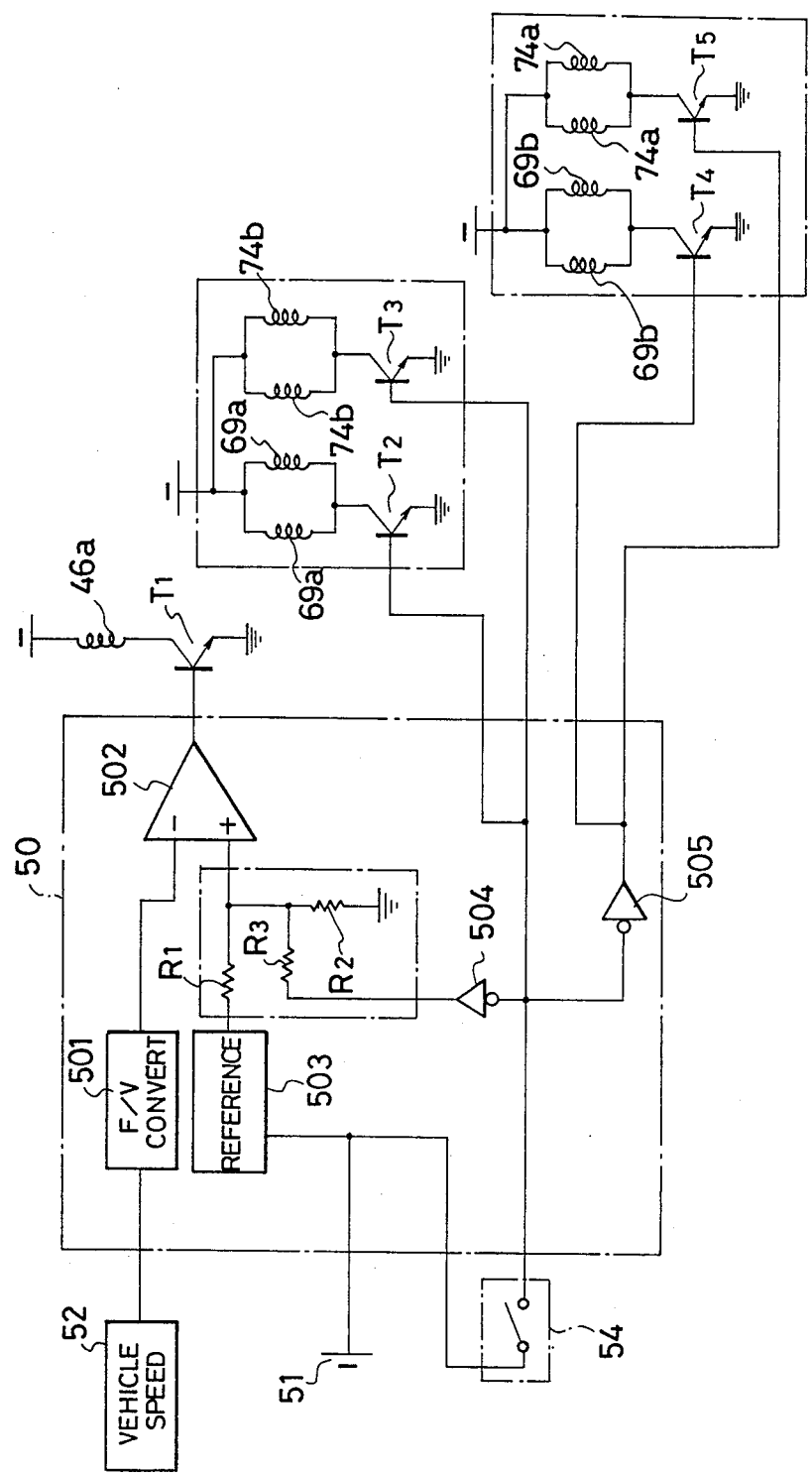
FIG. 16 is a circuit diagram which is used in a further embodiment of the present invention.
Figure 17:
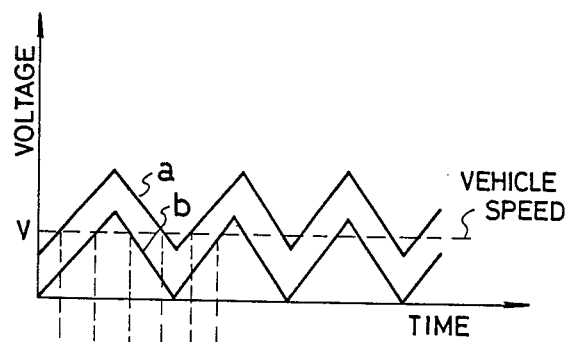
FIGS. 17 to 19 show input and output signals in the circuit shown in FIG. 16.
Figure 18:
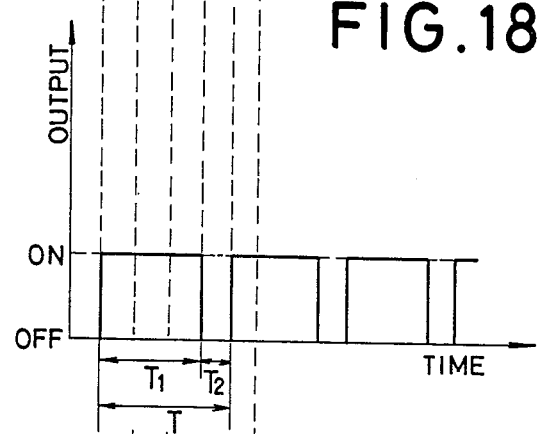
Figure 19:
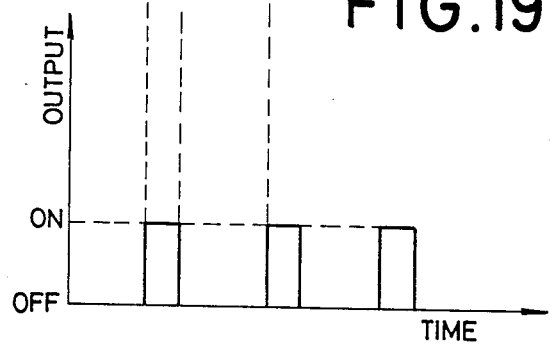

FIG. 16 shows an example of the control circuit 50. In this example, the circuit 50 has an F/V converter 501 which is connected with the output of the vehicle speed detector 52 to convert the frequency signal from the detector 52 into a voltage signal. The output of the converter 501 is connected with a negative input of a comparator 502. The electric power source 51 is connected with a reference circuit 503 which produces a triangular reference voltage as shown by a line a in FIG. 17. The output of the circuit 503 is connected through a resistor R1 with a positive input of the comparator 502. The positive input of the comparator 502 is further grounded through a resistor R2. The electric power source 51 is connected through the manual switch 54, an inverter 504 and a resistor R3 with the positive terminal of the comparator 502. The output of the comparator 502 is connected with the base of a transistor T1 having a collector which may be connected with the solenoid 46a of the power steering system. The emitter of the transistor T1 is grounded. It will therefore be understood that, when the manual switch 54 is not actuated, the comparator 502 compares the output of the F/V converter 501 with the output of the reference circuit 503 and produces a pulse signal as shown in FIG. 18. The output of the comparator 502 then turns the transistor T1 on to thereby energize the solenoid 46a. The pulse width T1 of the output of the comparator 502 is dependent on the vehicle speed and the ratio of the pulse width T1 to the cycle T of the triangular signal from the circuit 503 determines the duty factor, which is proportional to the electric power applied to the solenoid 46a. The plunger 46b of the control valve 46 is then shifted by a distance proportional to the duty factor. As the vehicle speed increases, the duty factor is decreased to thereby decrease the opening of the bypass passage 48. When the switch 54 is actuated, the level of the signal applied to the positive input of the comparator 502 is decreased as shown by a line b in FIG. 17. Thus, the pulse width of the output of the comparator 502 is decreased as shown in FIG. 19 to thereby increase the opening of the bypass passage 48.

As shown in FIG. 16, the manual switch is connected with bases of transistors T2 and T3 having collectors which may respectively be connected with the solenoids 69a and the solenoid valves 74b shown in FIG. 2. The emitters of the transistors T2 and T3 are grounded. The manual switch 54 is further connected through an inverter 505 with bases of transistors T4 and T5 having collectors which may respectively be connected with the solenoids 69b and the solenoid valves 74a shown in FIG. 2. The emitters of the transistors T4 and T5 are grounded. Thus, actuation of the switch 54 energizes the solenoids 69a and the solenoid valves 74b but de-energizes the solenoids 69b and the solenoid valves 74a. However, when when the switch 54 is opened, the solenoids 69a and the solenoid valves 74b are de-energized together with the solenoid 46a and the solenoids 69b and the solenoid valves 74a are energized.

In an alternative arrangement, the inverter 504 may be omitted. In such an arrangement, the level of the signal applied to the positive input of the comparator 502 is increased when the switch 54 is actuated so that the effects of the adjustment are reversed.

Figure 20:
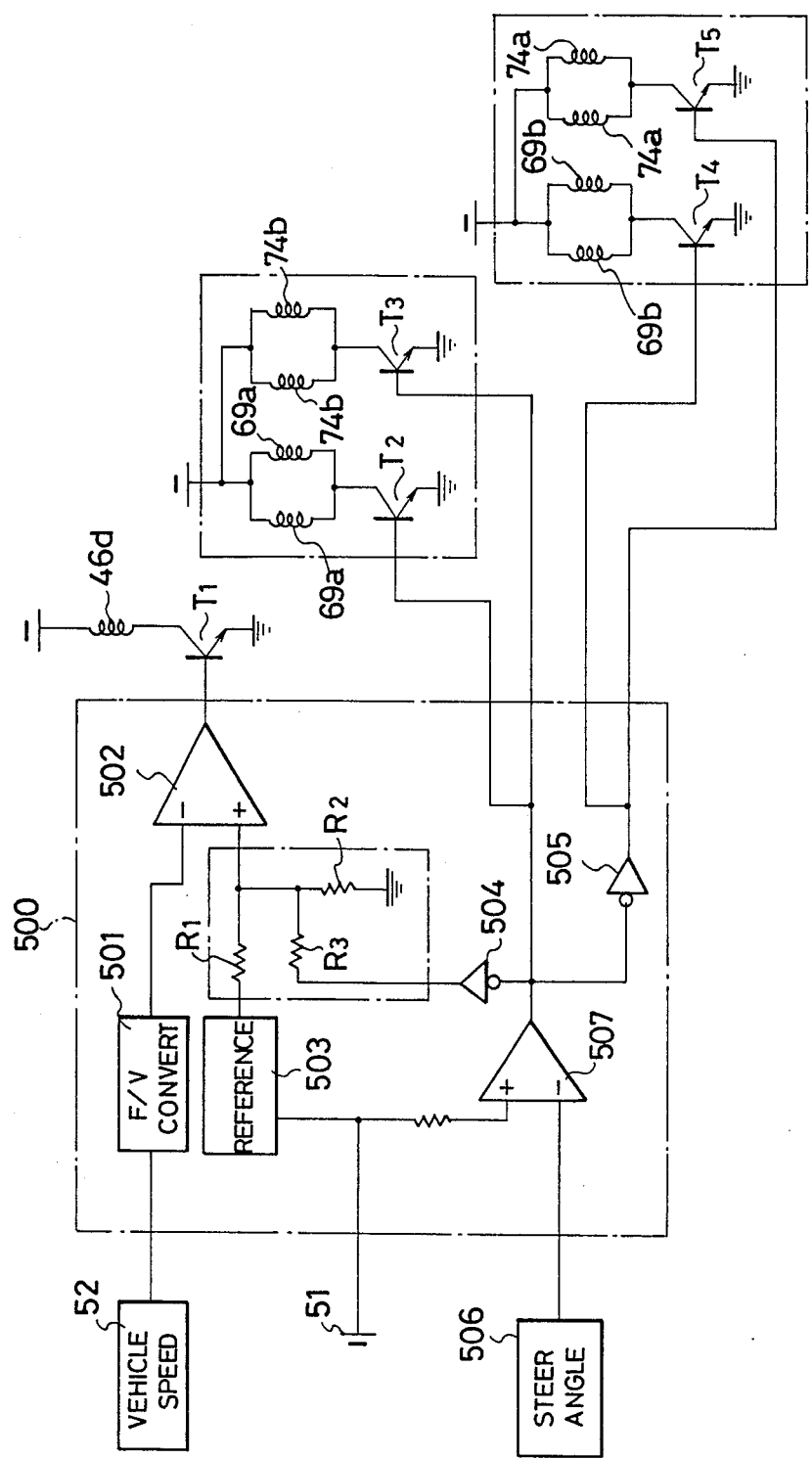
FIG. 20 is a circuit diagram showing a further embodiment.

In FIG. 20, there is shown a control circuit 500 which is identical to the circuit 50 in FIG. 16 except that it receives a signal from a steering angle detector 506. The output of the steering angle detector 506 is connected with a negative input of a comparator 507 which is substituted for the manual switch 54 in the circuit of FIG. 16. The comparator 507 has a positive input connected with the power source 51 so that the comparator 507 produces an output when the steering angle exceeds a predetermined value to change the characteristics of the suspension mechanisms and that of the steering mechanism.

Figure 21:
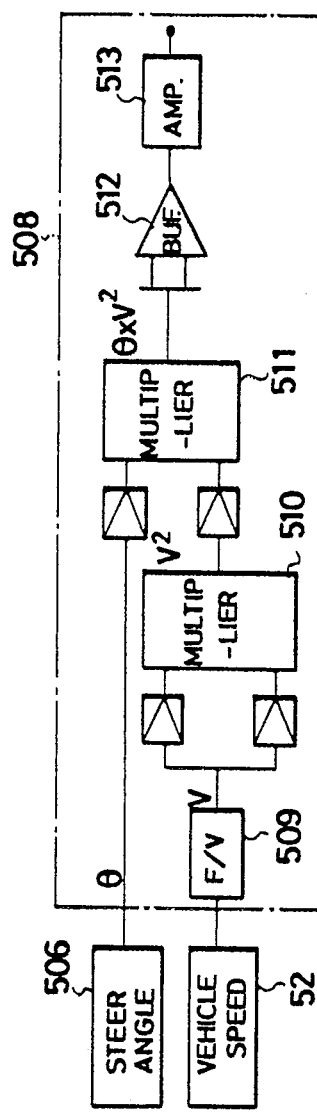
FIG. 21 is a circuit block diagram showing a still further embodiment of the present invention.

FIG. 21 shows a circuit 508 which may be substituted for the comparator 507 in FIG. 20. The circuit 508 has an F/V converter 509 connected with the output of the vehicle speed detector 52 for producing a speed signal V which is applied to a multiplier 510 to produce a squared speed signal $V^2$. The squared speed signal $V^2$ and a steering angle signal $\theta$ from the steering angle detector 506 are multiplied to produce a signal $\theta \cdot V^2$ which is applied through a buffer 512 to an amplifier 513.

The invention has thus been shown and described with reference to specific embodiments, however, it should be noted that the invention is in no way limited to the details of the illustrated arrangements, but changes and modifications may be made within the scope of the appended claims.

We claim:

1. A motor vehicle comprising: a body, wheels for supporting said body and including steerable wheels, first suspension means between said body and at least one of said wheels, second suspension means between said body and another of said wheels, manually operated steering means for steering said steerable wheels, said first suspension means including first resistance means for providing a first resistance level to vertical movements of said body with respect to said wheels, said second suspension means including second resistance means for providing a second resistance level to vertical movements of said body with respect to said wheels, one of said first and said second resistance means being a variable resistance means, first adjusting means for adjusting the resistance of said variable resistance means of at least one of said first and said second suspension means to change the ratio of said first resistance level to said second resistance level, second adjusting means for adjusting the operating force necessary to operate said steering means, control means for providing a control signal to said first adjusting means for adjusting the ratio of the first resistance level to the second resistance level of said first and second suspension means and for providing a control signal to the second adjusting means to adjust the operating force necessary to operate said steering means in predetermined relationship to the adjustment of said ratio of the first to the second resistance levels of the first and second suspension means, and switch means operatively connected to said control means for selectively providing desired adjustment of said variable resistance means and desired adjustment of the force necessary to operate said steering means.

2. A motor vehicle in accordance with claim 1 in which said wheels include front wheels and rear wheels, said first suspension means includes front suspension means between said body and each of said front wheels, and said second suspension means includes rear suspension means between said body and each of said rear wheels.

3. A motor vehicle in accordance with claim 2 in which said steering means includes hydraulic means for providing hydraulic assist to reduce the steering force required to operate the steering means, said second adjusting means including hydraulic valve means for changing the effect of said hydraulic means on the steering force.

4. A motor vehicle in accordance with claim 1 in which said first adjusting means includes means for adjusting said one of said first and second resistance means of said first and second suspension means to change said ratio of said first to said second resistance levels.

5. A motor vehicle in accordance with claim 2 in which said first adjusting means includes means for adjusting only the second resistance level to change said ratio of said first to said second resistance levels.

6. A motor vehicle in accordance with claim 1 in which said first and second resistance means include oleo damper means having means for providing damping of vehicle body motion relative to said wheels, said oleo damper means of at least one of said first and second resistance means being a variable oleo damper means to provide variable damping, said first adjusting means including means operatively connected with said variable oleo damper means for varying the damping effect of said variable oleo damper means.

7. A motor vehicle in accordance with claim 1 in which said first and second resistance means include air spring means respectively having a spring rate, said air spring means of said at least one of said first and second resistance means being a variable air spring means to provide a variable spring rate, said first adjusting means having means operatively connected with said variable air spring means for varying the spring rate of said variable air spring means.

8. A motor vehicle in accordance with claim 1 which further includes vehicle speed detecting means for providing a vehicle speed signal to said control means, said control means including means responsive to said vehicle speed signal for controlling said second adjusting means in accordance with the vehicle speed.

9. A motor vehicle in accordance with claim 1 in which said wheels include front left and front right wheels and rear left and rear right wheels, said first suspension means including interconnected first variable resistance means for the front right and rear left wheels, and said second suspension means including interconnected second variable resistance means for the front left and rear right wheels.

10. A motor vehicle in accordance with claim 1 in which said steering means includes a steering gear having a variable gear ratio, said second adjusting means including gear shift means operatively connected with said steering gear for changing the gear ratio.

11. A motor vehicle in accordance with claim 3 in which said control means includes means for producing a control signal to said second adjusting means for decreasing the operative force necessary to operate the steering means when the ratio of the first to the second resistance levels of said first and second suspension means is increased.

12. A motor vehicle in accordance with claim 3 in which said control means includes means for producing a control signal to said second adjusting means for increasing the operative force necessary to operate the steering means when the ratio of the first to the second resistance levels of said first and second suspension means is increased.

13. A motor vehicle in accordance with claim 10 in which said control means includes means for producing a control signal for increasing the gear ratio of the steering gear when the ratio of the first to the second resistance levels of said first and second suspension means is increased.

14. A motor vehicle in accordance with claim 10 in which said control means includes means for producing a control signal for decreasing the gear ratio of the steering gear when the ratio of the first to the second resistance levels of said first and second suspension means is increased.

15. A motor vehicle in accordance with claim 1 in which said switch means includes a manually operated, two-position switch.

16. A motor vehicle in accordance with claim 1 in which said switch means includes steering angle detector means connected to said steering means for providing an output signal to said control means when said steering means has been turned through a predetermined angle, said output signal operating to change the resistance of said suspension means and the operating force necessary to operate said steering means when said steering means has been turned through said predetermined angle.

* * * * *